(12) United States Patent
Flatebo et al.

(10) Patent No.: US 10,179,547 B2
(45) Date of Patent: Jan. 15, 2019

(54) SIDE PACK WITH CHANNELS

(71) Applicants: James Aaron Flatebo, Garner, IA (US);
Scott Aaron Britson, Garner, IA (US);
Matthew Wendell Schroeder, Ventura, IA (US)

(72) Inventors: James Aaron Flatebo, Garner, IA (US);
Scott Aaron Britson, Garner, IA (US);
Matthew Wendell Schroeder, Ventura, IA (US)

(73) Assignee: Stellar Industries, Inc., Garner, IA (US)

( * ) Notice: Subject to any disclaimer, the term of this patent is extended or adjusted under 35 U.S.C. 154(b) by 519 days.

(21) Appl. No.: 13/901,942

(22) Filed: May 24, 2013

(65) Prior Publication Data

US 2014/0346204 A1    Nov. 27, 2014

(51) Int. Cl.
*B65D 88/00* (2006.01)
*B60R 9/06* (2006.01)

(52) U.S. Cl.
CPC .................................... *B60R 9/065* (2013.01)

(58) Field of Classification Search
CPC ............ B65D 2519/00024; B65D 2519/00059
USPC ..... 220/4.26, 4.27, 23.6, 781; 206/509, 511, 206/512; 414/749.6
See application file for complete search history.

(56) References Cited

U.S. PATENT DOCUMENTS

| | | | | |
|---|---|---|---|---|
| 3,516,556 A * | 6/1970 | Nelson | ......................... | 220/23.4 |
| 4,116,344 A * | 9/1978 | Ziemba | ......................... | 410/119 |
| 4,850,283 A * | 7/1989 | Carvin | ......................... | 108/51.11 |
| 5,142,445 A * | 8/1992 | Sorensen et al. | .............. | 361/726 |
| 5,409,335 A * | 4/1995 | Beck | ..................... | B60P 7/0815 410/104 |
| 6,164,882 A * | 12/2000 | Selle | ..................... | B60P 7/0815 410/2 |
| 6,334,709 B1 * | 1/2002 | Bois | ............................... | 383/37 |
| 6,471,402 B1 * | 10/2002 | Burns | ............................. | 383/32 |
| 6,846,140 B2 * | 1/2005 | Anderson | ............. | B60P 7/0815 410/102 |
| 7,311,202 B2 * | 12/2007 | Chen | ............................. | 206/504 |
| 7,497,347 B2 * | 3/2009 | Norris, Jr. | ...................... | 220/1.5 |
| 8,590,704 B2 * | 11/2013 | Koenig et al. | ................. | 206/508 |
| 2006/0076261 A1 * | 4/2006 | Kurtenbach | .................. | 206/511 |
| 2009/0178989 A1 * | 7/2009 | Accuardi | ................... | 211/126.7 |

* cited by examiner

*Primary Examiner* — Derek Battisti
(74) *Attorney, Agent, or Firm* — David M. Breiner; BrownWinick Law Firm

(57) ABSTRACT

Disclosed is a side pack that may be on a utility vehicle. In example embodiments, a top panel of the side pack includes channels that are used to connect an option, for example, mechanical equipment, to the side pack. Disclosed also is a method of moving the side pack.

12 Claims, 23 Drawing Sheets

SIDE PACK WITH CHANNELS

BACKGROUND

1. Field

Example embodiments disclose a side pack with channels. In example embodiments, tracks may be provided in the channels to allow for objects, such as mechanical equipment, to attach thereto. In example embodiments, the channels may also be configured to route wiring therein.

2. Description of the Related Art

Utility vehicles are used in a variety of industries to provide services to industry customers. Utility vehicles are usually truck type vehicles that have a bed for carrying cargo and storage units mounted on the sides of the beds. The storage units are often referred to as "side packs." In the conventional art, side packs generally form a plurality of enclosures in which items such as equipment (for example, tools, cables, pumps, etc.) and chemicals may be stored.

FIG. 1 is a partial view of a utility vehicle 90 having a side pack 10 mounted on the vehicle's bed 50. In this example, the side pack 10 is comprised of a first substructure 20 and a second substructure 30. The first substructure 20 includes a first top panel 22 and the second substructure 30 includes a second top panel 32. In the conventional art, various types of equipment, for example, cranes, may be mounted on the first and second top panels 22 and 32. FIGS. 2 and 3, for example, illustrate operations for mounting equipment 60 on the second top panel 32. In this particular example, the equipment 60 include a base plate 62 with four holes arranged at the corners thereof. The equipment 60 is mounted on the second top panel 32 by drilling out four holes 34 corresponding to the four holes on the base plate 62 and then attaching the base plate 62 to the second top panel 32 by a plurality of nuts and bolts.

FIG. 3 illustrates the equipment 60 mounted on the second top panel 32. In the event it is desired to move the equipment 60 to a different location on the second top panel 32, a different plurality of holes must be drilled in the second top panel 32 at the different location so the equipment may be attached thereto. The original holes 34 must then be covered or plugged to protect the contents of the side pack 10 from the environment.

SUMMARY

Example embodiments disclose a side pack with channels. In example embodiments, tracks may be provided in the channels to allow for objects, such as mechanical equipment, to be attached thereto. In example embodiments, the channels may also be configured to route various lines therein. The lines, for example, may be used for transmitting power. For example, the lines could be, but are not limited to, electrical, pneumatic, and/or hydraulic lines. In example embodiments, the lines may attach to equipment that may be mounted on the side pack.

In accordance with example embodiments, a side pack may include a first top panel with at least one channel and at least one track in the at least one channel.

In accordance with example embodiments, a method of moving a side pack may include arranging a jig above a center of gravity of the side pack, connecting the jig to a track of the side pack, and applying a substantially vertical force to the jig to lift the side pack.

BRIEF DESCRIPTION OF THE DRAWINGS

Example embodiments are described in detail below with reference to the attached drawing figures, wherein.

DETAILED DESCRIPTION

Figure 1:
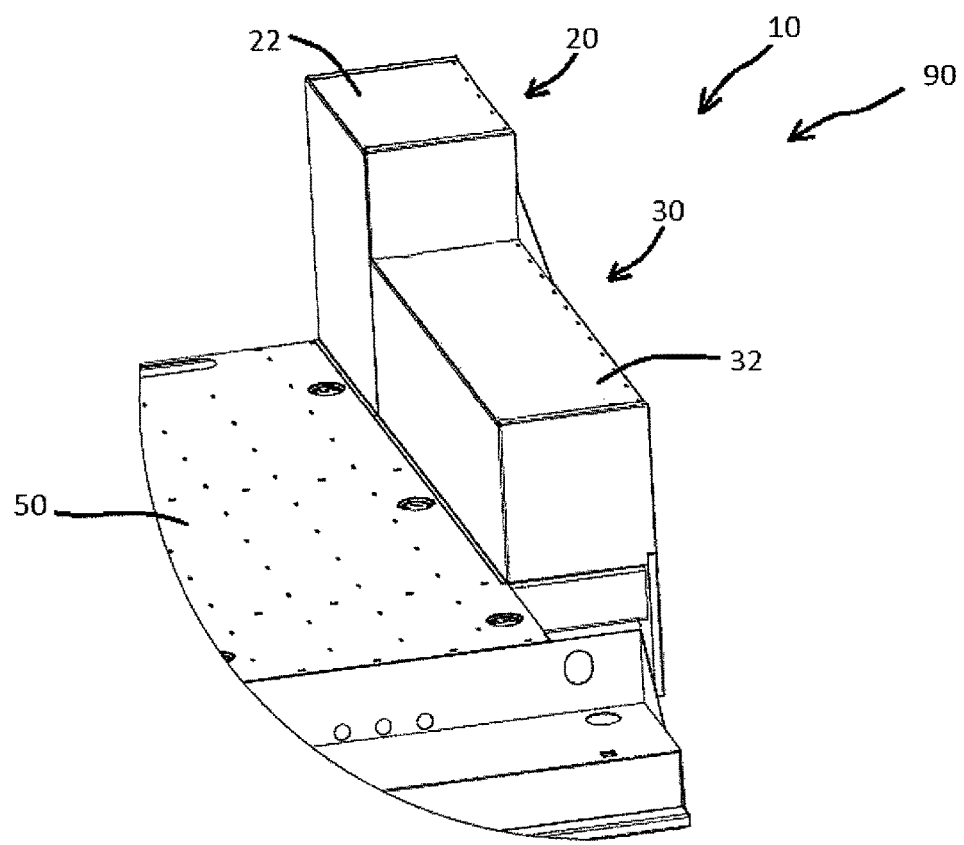
FIGS. 1-3 are a views of a side pack in accordance with the conventional art.
Figure 2:
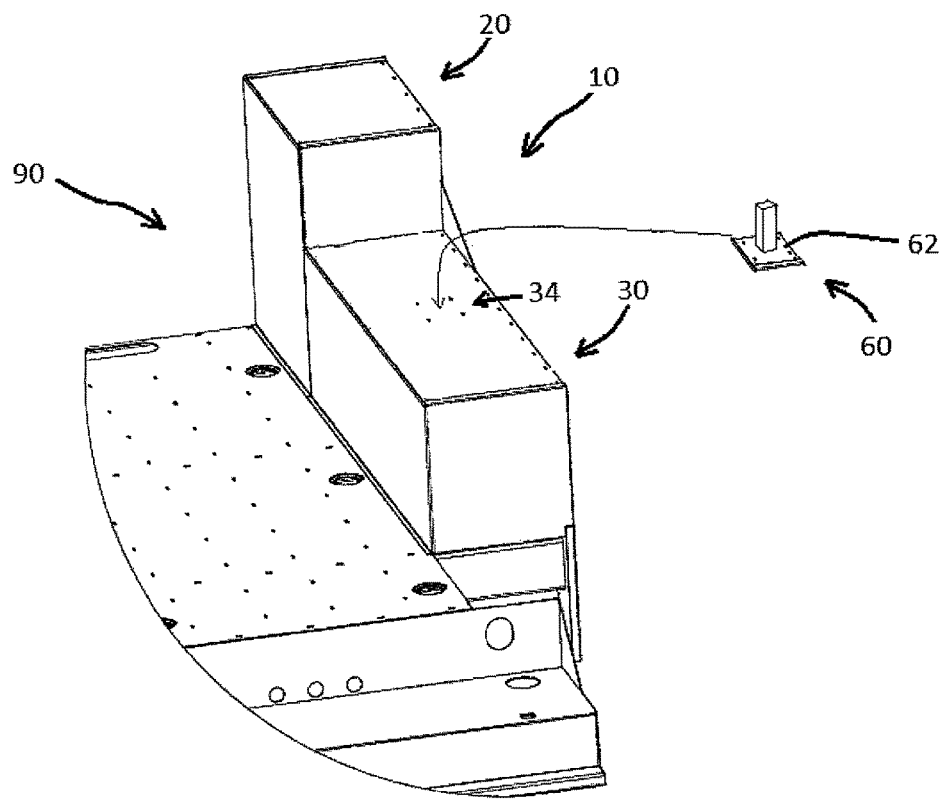
Figure 3:
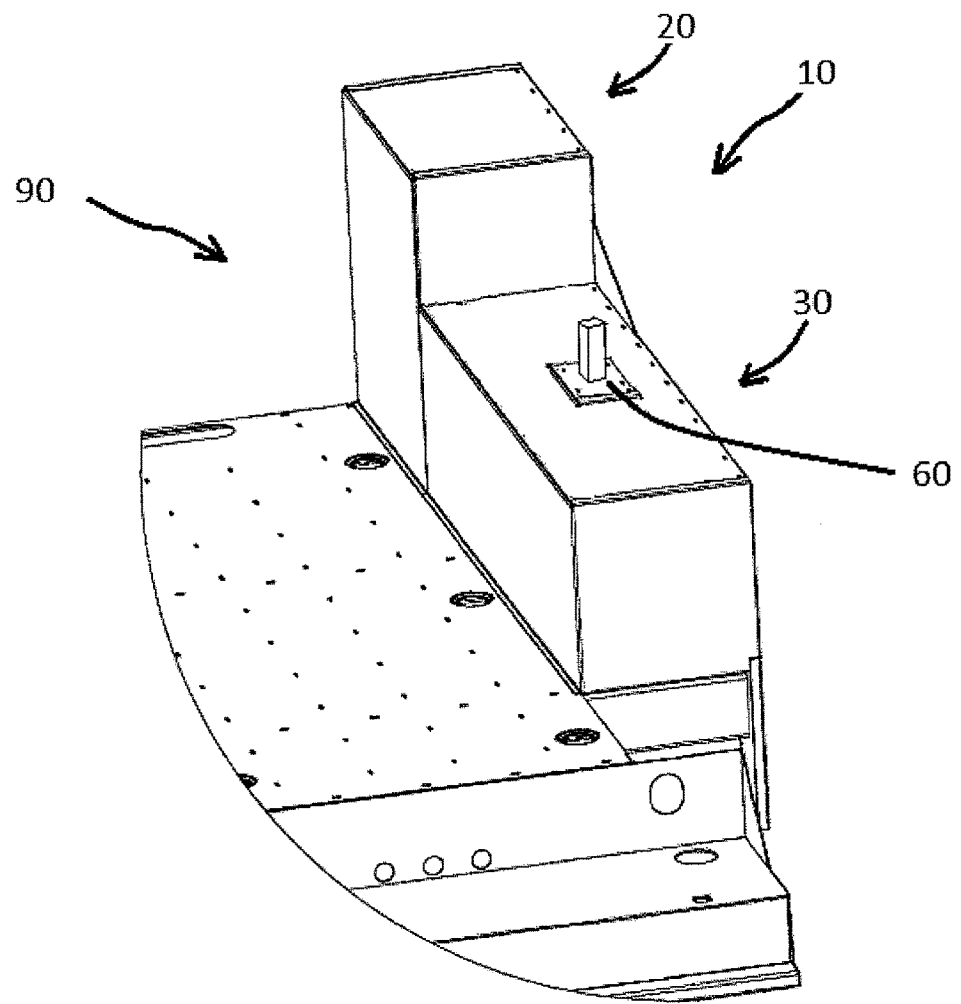

Example embodiments will now be described more fully with reference to the accompanying drawings. Example embodiments are not intended to limit the invention since the invention may be embodied in different forms. Rather, example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Example embodiments disclose a side pack with channels. In example embodiments, tracks may be provided in the channels to allow for objects, such as mechanical equipment, to be attached thereto. In example embodiments, the channels may also be configured to route wiring therein to power equipment that may be mounted thereto.

Figure 4:
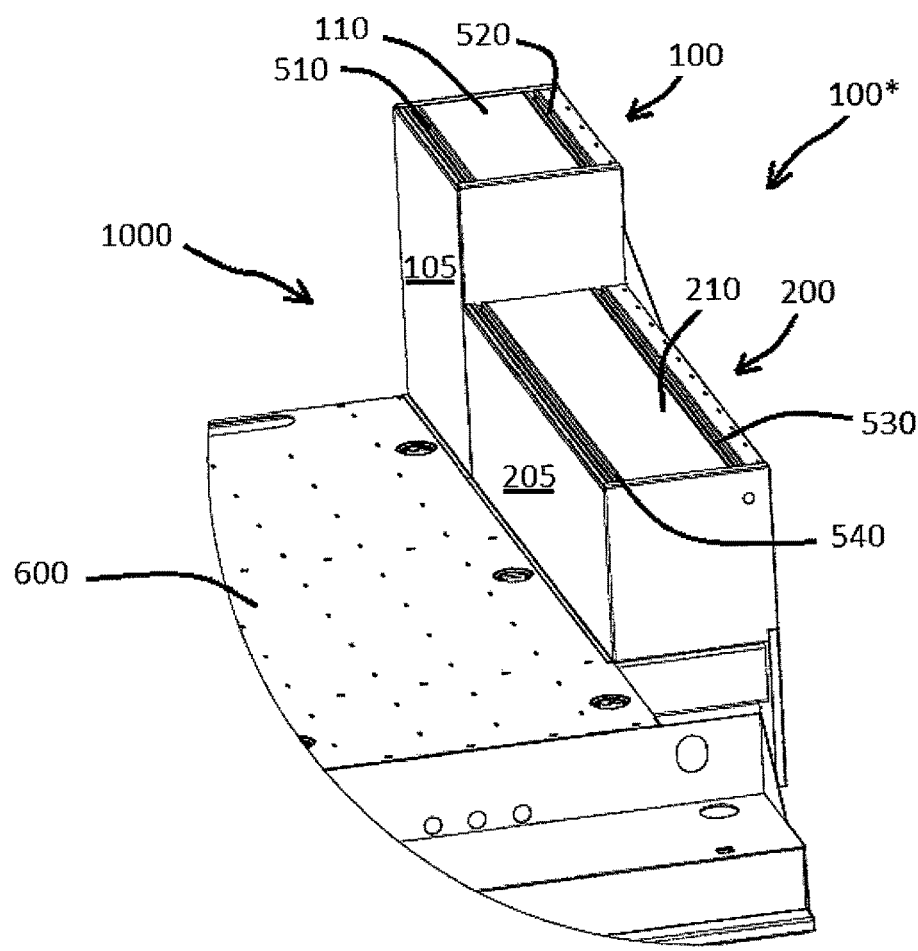
FIG. 4 is a view of a side pack in accordance with example embodiments.

FIG. 4 is a partial view of a utility vehicle 1000 in accordance with example embodiments. In example embodiments, the utility vehicle 1000 may include a bed 600 and a side pack 100* arranged at a side of the bed 600. As in the conventional art, the side pack 100* may form compartments that may be usable for storing items such as equipment and/or chemicals.

In FIG. 4, the side pack 100* is illustrated as including a first substructure 100 and a second substructure 200. Although FIG. 4 illustrates the side pack 100* as including a first substructure 100 and a second substructure 200, the number of substructures is not intended to be a limiting feature of the invention. For example, the side pack 100* according to example embodiments may include more than two substructures or only a single structure. In example embodiments, the first substructure 100 may include a first top panel 110 and the second substructure 200 may include a second top panel 210. Unlike the conventional art, the first and second top panels 110 and 210 include channels in which tracks may be arranged.

Figure 5A:
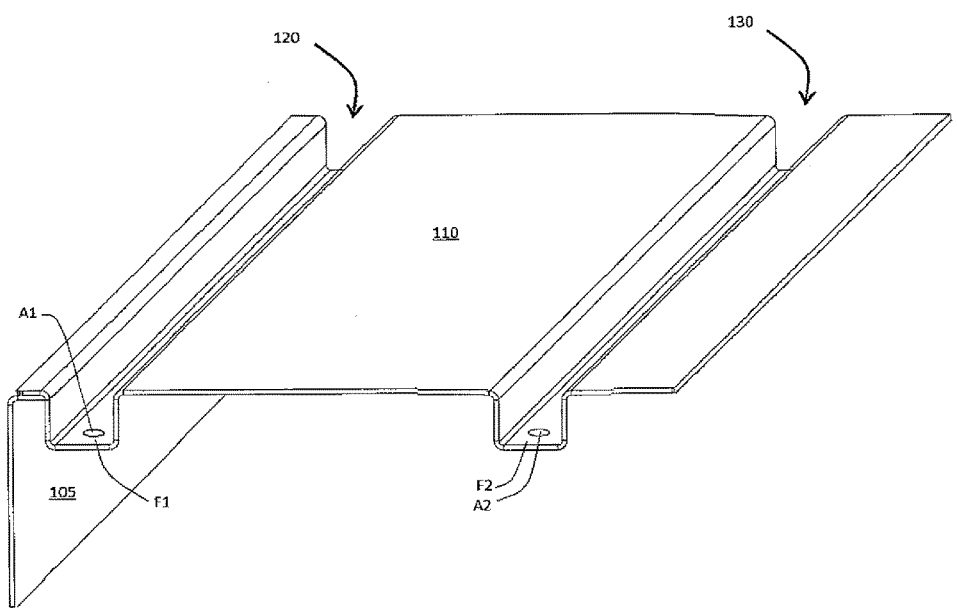
FIGS. 5A-5B are views of a top panel in accordance with example embodiments.
Figure 5B:
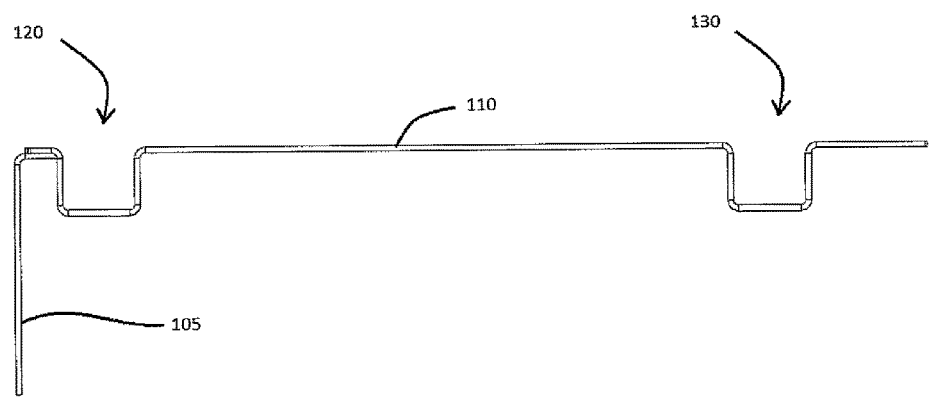

FIG. 5A is a perspective view of the first top panel 110 in accordance with example embodiments and FIG. 5B is a section view of the first top panel 110 in accordance with example embodiments. As shown in FIG. 5A, the first top panel 110 may resemble a substantially flat plate with a first channel 120 and a second channel 130 formed therein. Although the first top panel 110 has been described and illustrated as including only a first channel 120 and a second channel 130, example embodiments are not limited thereto. For example, in example embodiments, the first top panel 110 may include only a single channel or more than two channels.

In example embodiments, the first and second channels 120 and 130 may extend along a length of the first top panel 110 as shown in FIG. 5A, however, example embodiments are not limited thereto as the first and second channels 120 and 130 may run a different direction, for example, a width direction of the first top panel 110. In addition, although the first and second channels 120 and 130 are illustrated as being substantially identical and being substantially parallel, example embodiments are not limited thereto as the channels 120 and 130 are not required to be identical nor are they required to be parallel.

Figure 6:
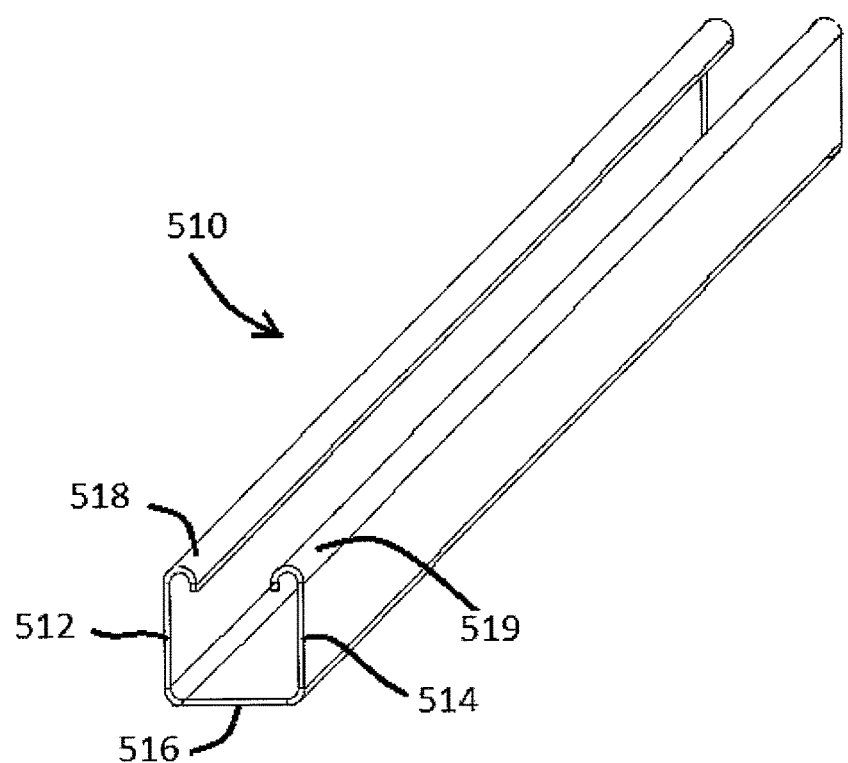
FIG. 6 is a view of a track in accordance with example embodiments.

FIG. 6 is a perspective view of a first track 510 in accordance with example embodiments. In example embodiments, the first track 510 may have a substantially C-shaped cross section. For example, in example embodiments, the first track 510 may include a first side wall 512, a second side wall 514, and a base 516 connecting the first side wall 512 to the second side wall 514. In example embodiments, an end of the first side wall 512 may be curved to form a first lip 518 which may be configured to engage securing members which will be described later. Similarly, the second side wall 514 may also include a curved end forming a second lip 519. In example embodiments, the second lip 519 may be configured to engage the aforementioned securing members.

It is emphasized that FIG. 6 illustrates only an example of the first track 510 and the example is not intended to limit the invention. For example, in example embodiments, the first track 510 may have another shape such as, but not limited to, a U, V, X, or L shape. In example embodiments, a second track 520, a third track 530, and a fourth track 540 may be substantially identical. However, descriptions thereof are omitted for the sake of brevity.

Figure 7A:
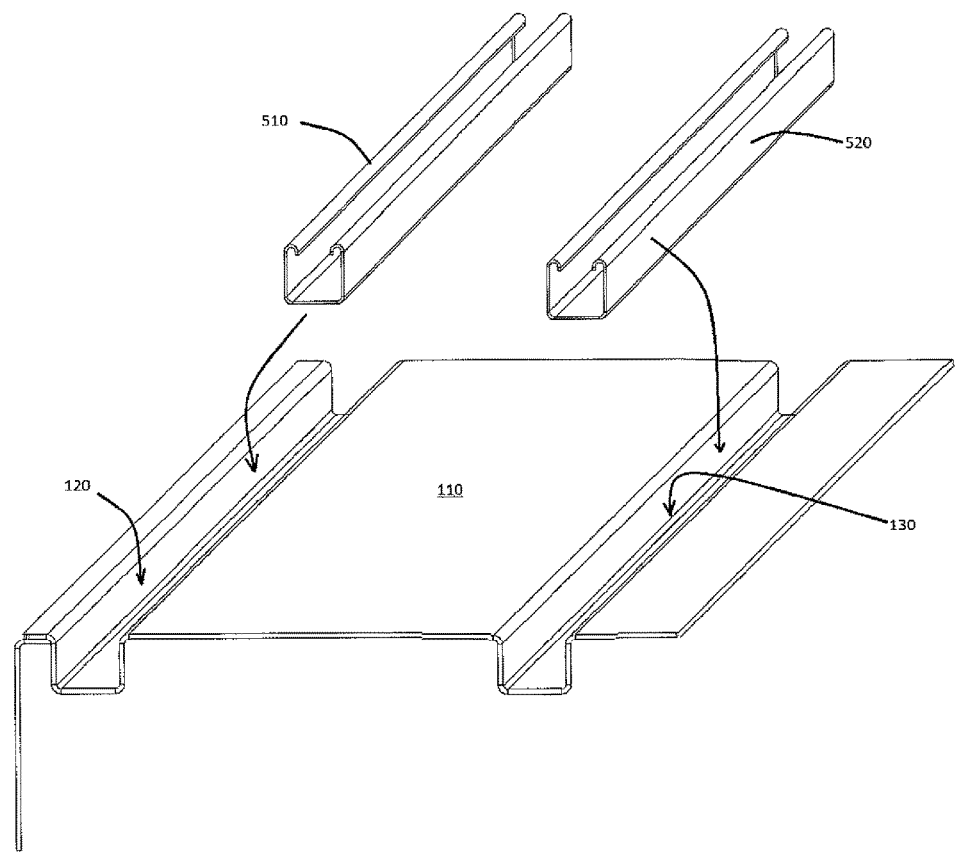
FIGS. 7A-7C illustrate tracks being inserted into channels of a top panel in accordance with example embodiments.
Figure 7B:
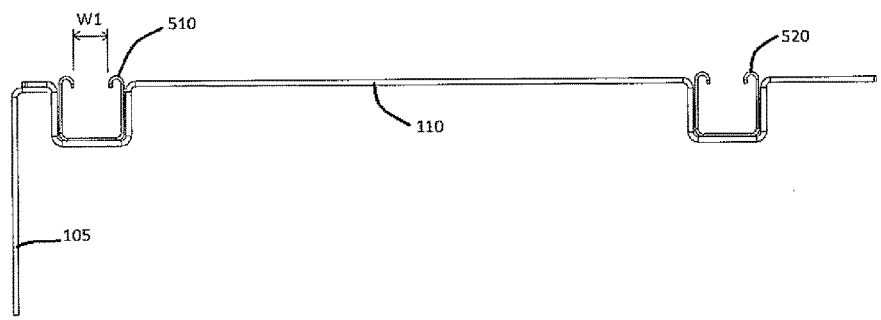
Figure 7C:
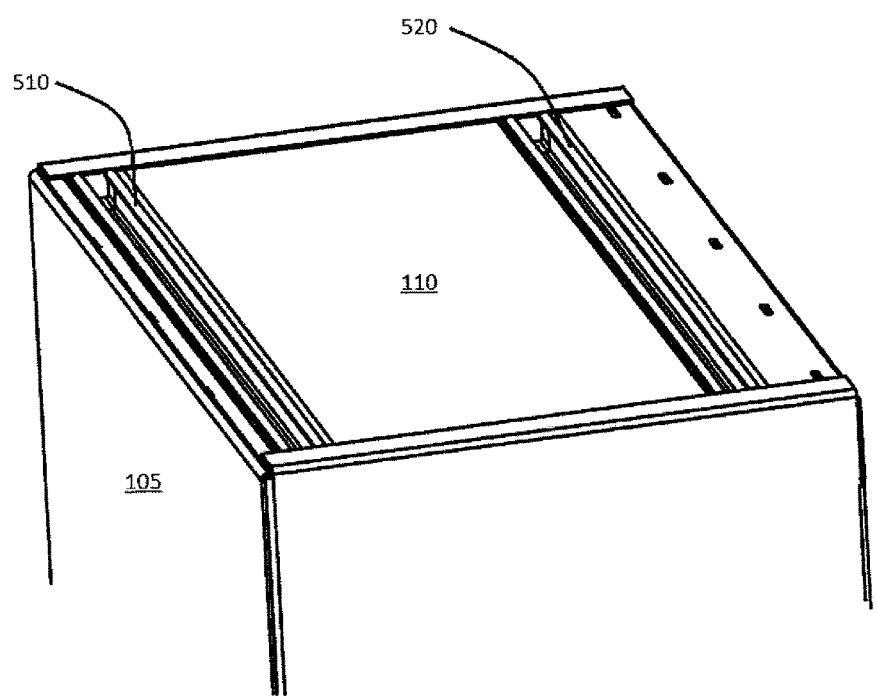

FIG. 7A illustrates the first track 510 and the second track 520 being inserted into the first channel 120 and the second channel 130 of the first top panel 110, FIG. 7B is a cross section of the first track 510 and the second track 520 inserted into the first channel 120 and the second channel 130, and FIG. 7C is a close-up view of the first and second tracks 510 and 520 inserted into the first top panel 110. As shown in FIG. 7B, the lips 518 and 519 of the first track 510 and the lips of the second track 520 may protrude out of the first top panel 110, however, this is not intended to be a limiting feature of example embodiments. For example, in example embodiments, the lips of the first track 510 and the second track 520 may be flush with a top surface of the top panel 110 or may be below the top surface of the top panel 110.

In example embodiments, the first and second tracks 510 and 520 may be connected to the first top panel 110 by a conventional technique such as welding, however, example embodiments are not limited thereto. For example, the first and second tracks 510 and 520 may be secured to the first top panel 110 by another means such as, but not limited to, pinning, bolting, adhering (for example, by gluing), or clipping.

Figure 8A:
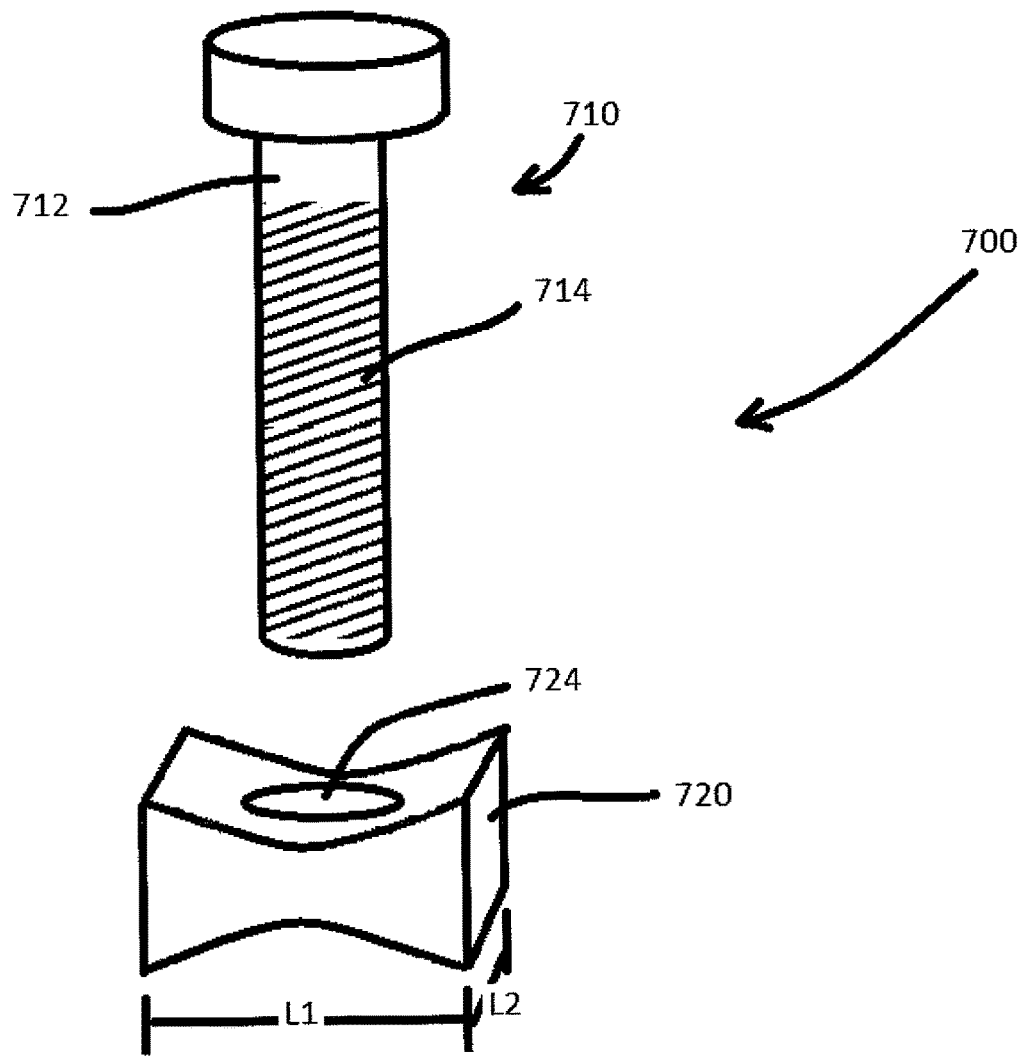
FIGS. 8A-8C are views of a securing device in accordance with example embodiments.
Figure 8B:
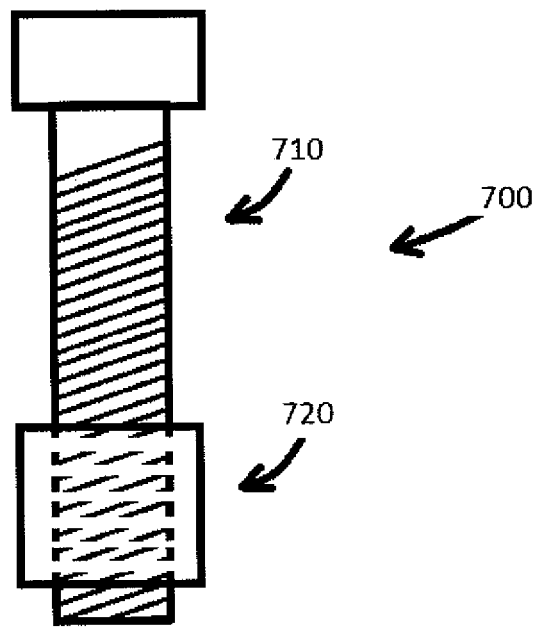
Figure 8C:
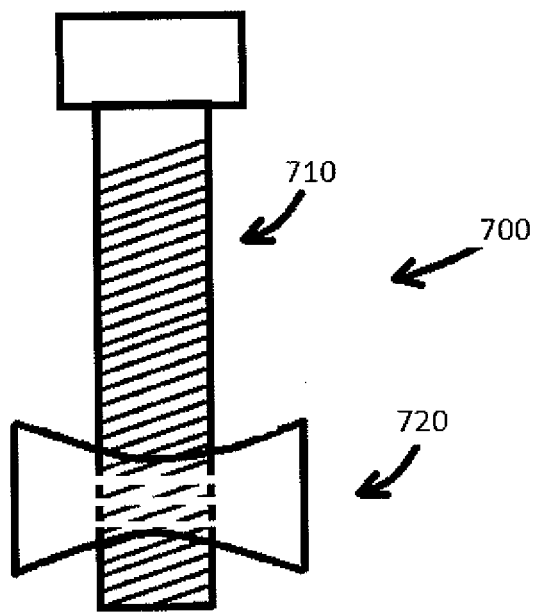
Figure 9A:
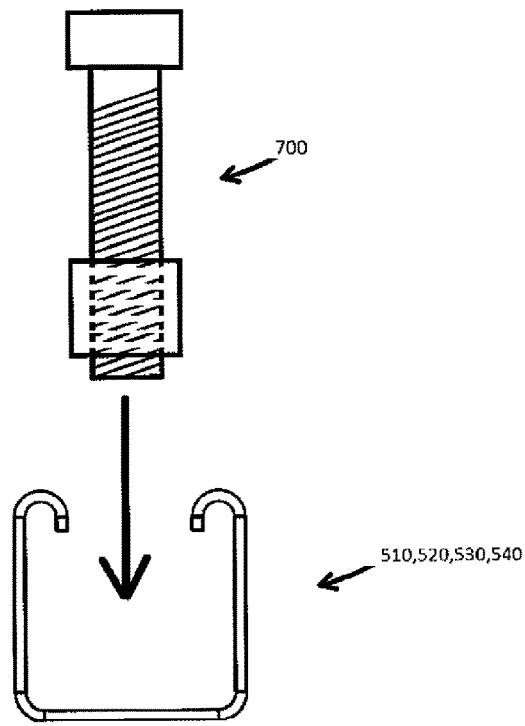
FIGS. 9A-9D are views of a securing device being inserted into a track in accordance with example embodiments.
Figure 9B:
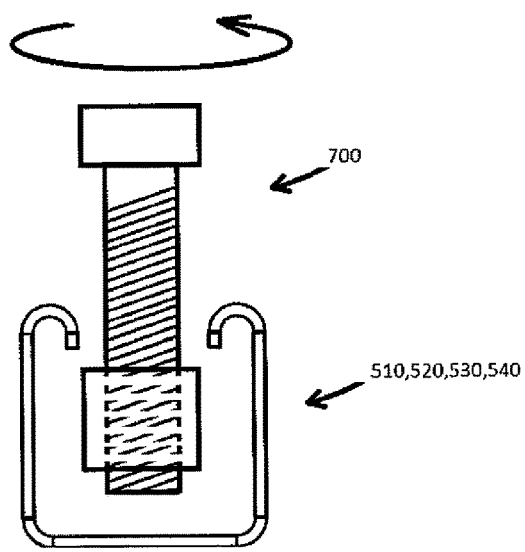
Figure 9C:
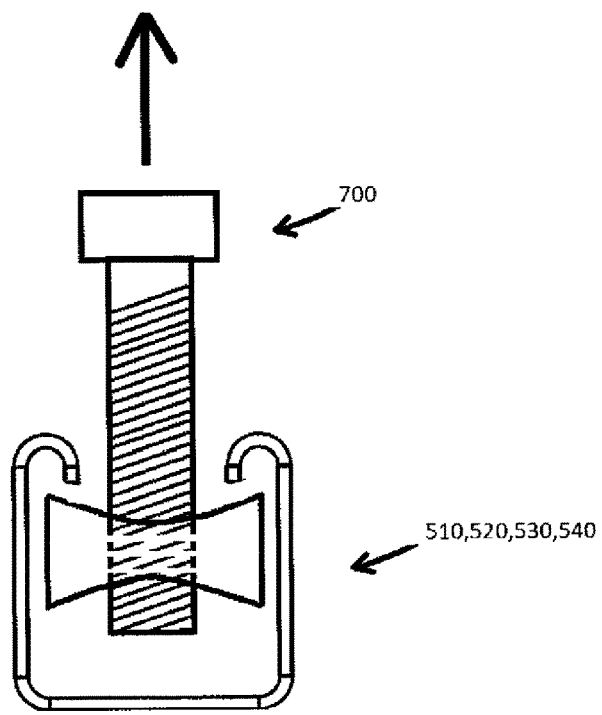
Figure 9D:
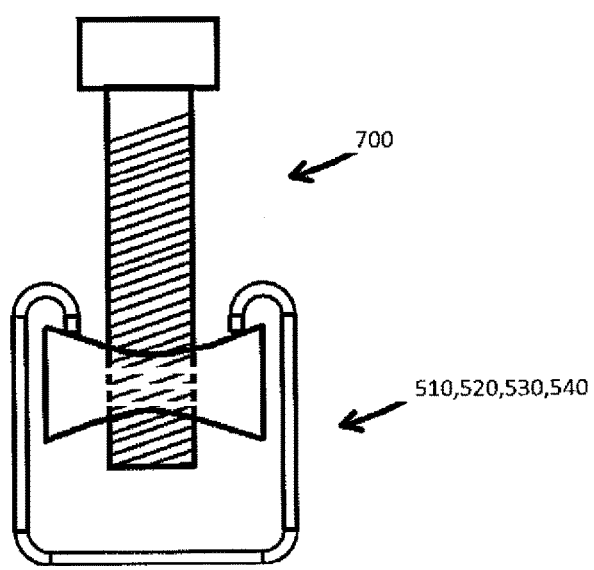

In example embodiments, the first and second tracks 510 and 520 may cooperate with securing members that may be used to connect a structure to the first top panel 110. FIGS. 8A-8C are views of a securing member 700 in accordance with example embodiments. In example embodiments, the securing member 700 may be comprised of a threaded member 710 and an elongated nut 720 configured to engage the threaded member 710. For example, in example embodiments the threaded member 710 may include a cylindrical member 712 having threads 714 arranged on an outside surface thereof. The elongated nut 720 may have a hole 724 with internal threads configured to engage the threads 714 of the of the threaded member 710. In example embodiments, the elongated nut 720 may resemble a rectangle having a first length L1 and a second length L2 wherein the first length L1 is longer than the second length L2. In example embodiments, the first length L1 may be longer than a distance W1 (see FIG. 7B) separating the lips of a track (for example, the distance separating the lips of any one of the first track 510, the second track 520, the third track 530, and the fourth track 540) and the second length L2 may be smaller than the distance W1 separating the lips of the track. Thus, when the nut 720 is arranged in a first orientation (see FIG. 9A), the nut 720 may pass through the lips of a track and therefore may be inserted into the track (see FIG. 9B). When the nut 720 is arranged in a second orientation, for example, by turning the nut 720 (see FIG. 9C) the nut 720 may not pass through the lips of a track (see FIG. 9D).

FIGS. 8B and 8C illustrate the threaded member 710 engaged with the nut 720. In example embodiments, the nut 720 may be moved along the cylindrical member 712 of the threaded member 710 by rotating the nut 720 with respect to the cylindrical member 712. In otherwords, as the threads of the nut 720 engage the threads 714 of the threaded member 710, the threaded surfaces may contact and slide past one another to allow the nut 720 to travel along a length of the threaded member 710.

In example embodiments, the inventive concepts of the first top panel 110 are equally applicable to the second top panel 210. For example, in example embodiments, the second top panel 210 may include a third channel and a fourth channel into which the third track 530 and the fourth track 540 may be installed as shown in at least FIG. 4.

Figure 10:
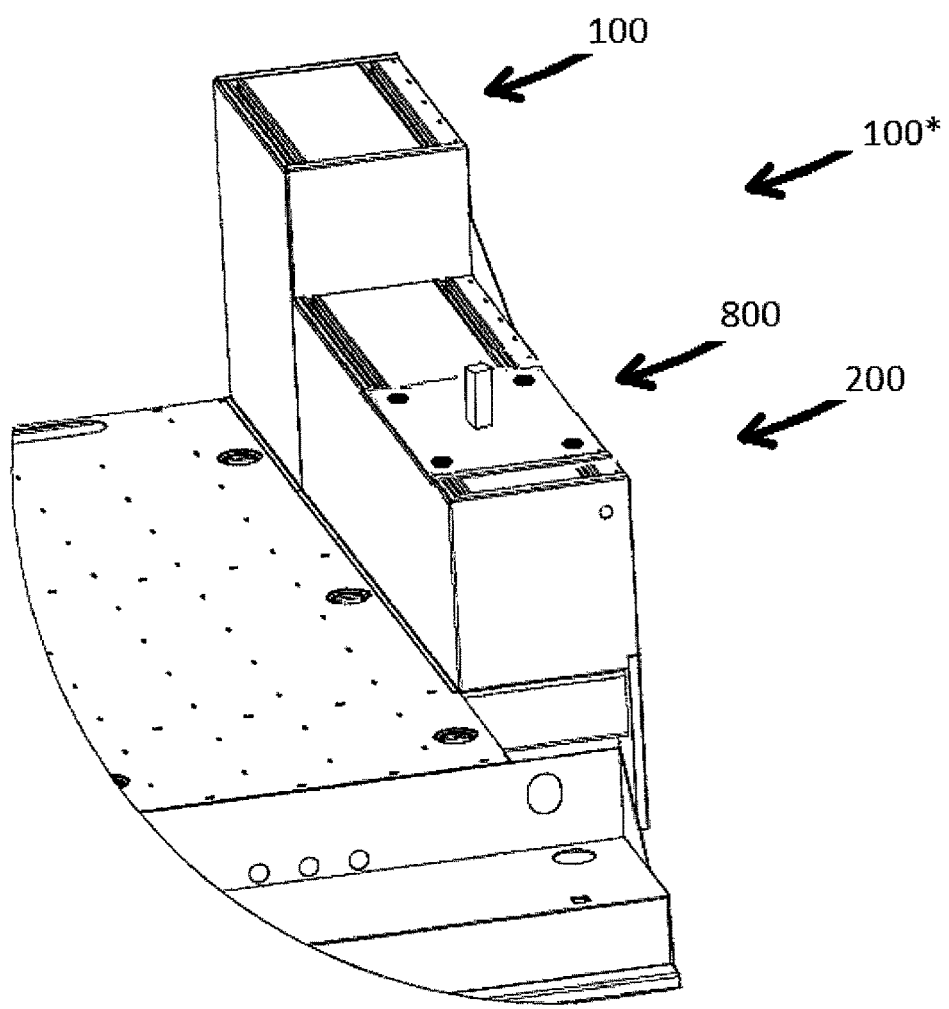
FIG. 10 is a view of a side pack with an option installed thereon in accordance with example embodiments.

FIG. 10 illustrates an option 800 attached to the second substructure 200 in accordance with example embodiments. In example embodiments, the option 800 may include a base plate 810 which may have holes arranged at the corners thereof. In example embodiments, holes may be arranged such that they lie over the third and fourth tracks 530 and 540 that are in the third and fourth channels of the second substructure 200. In example embodiments, the holes of the base plate 810 may be large enough to allow the threaded member 710 of the securing members 700 to pass through.

Figure 11A:
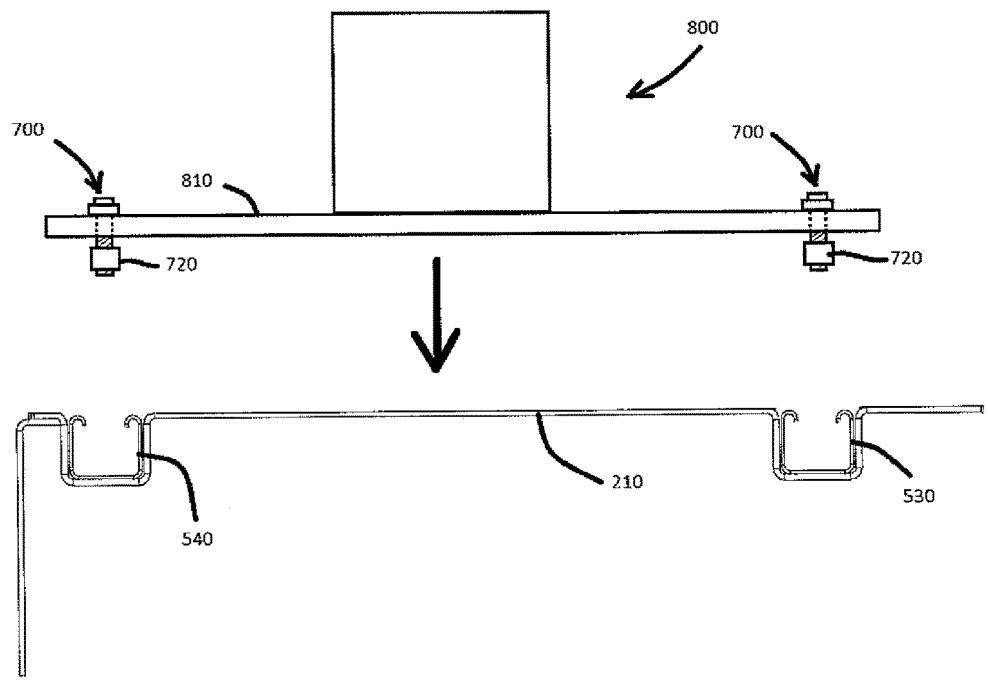
FIGS. 11A-11E illustrate operations of installing an option on a side pack in accordance with example embodiments.
Figure 11B:
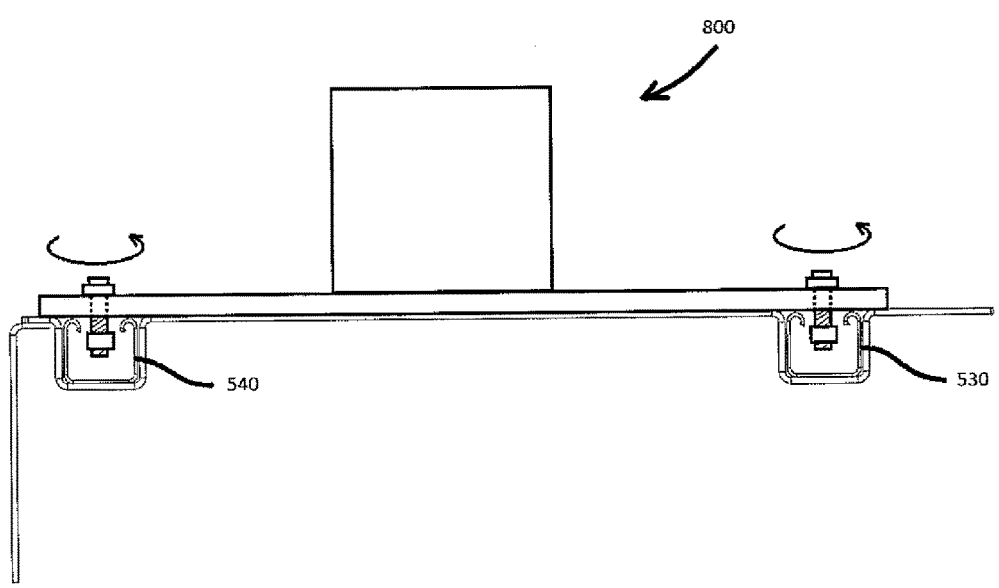
Figure 11C:
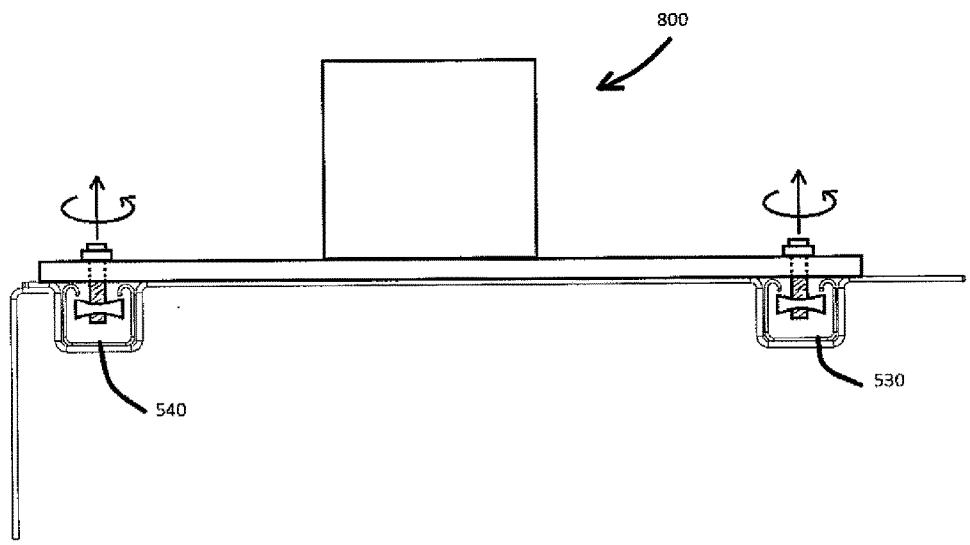
Figure 11D:
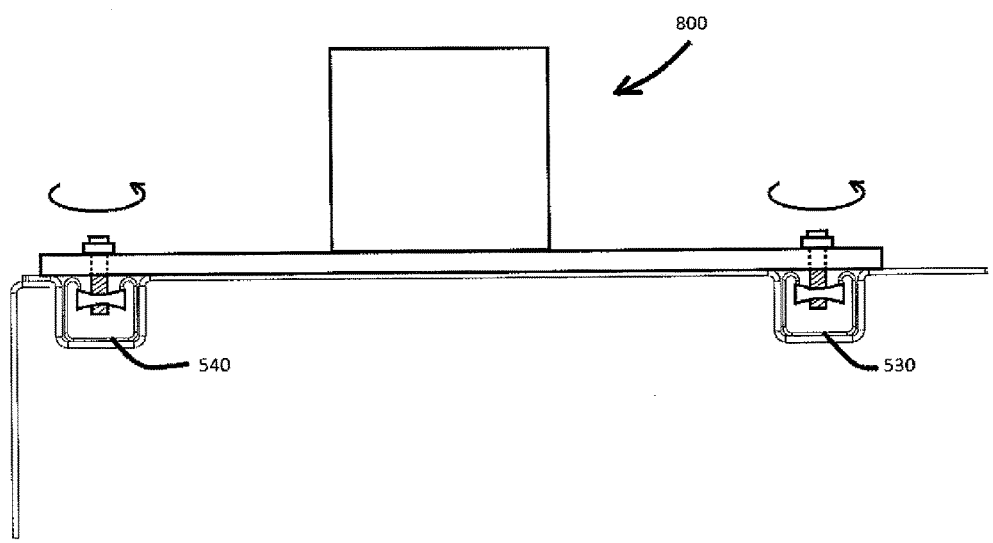

FIGS. 11A-11D illustrate a method of attaching the option 800 to the second substructure 200. As shown in FIG. 11A, the option 800 may include a plurality of securing members 700 passing through a plurality of holes arranged in the baseplate 810 of the option 800. In example embodiments, the nuts 720 of the securing members may be oriented so that nuts 720 may be inserted into the second and third tracks 530 and 540 as shown in FIG. 11B. Once the nuts 720 are arranged in the third and fourth tracks 530 and 540, the nuts 720 may be rotated (for example, by rotating the cylindrical members 712 of the securing members) so that the orientation of the nuts 720 are such that the nuts 720 are captured by the third and fourth tracks 530 and 540 as shown in FIG. 11C. In this configuration, the cylindrical members 712 may be pulled back until the nuts 720 engage the lips of the third and fourth tracks 530 and 540. In this configuration, the cylindrical members 712 may be rotated further to move the nuts 712 relative to the cylindrical member 712 until the lips are clamped between the nuts 720 and the base plate 810 as shown in FIG. 11D thus securing the option 800 to the second substructure 200.

Figure 11E:
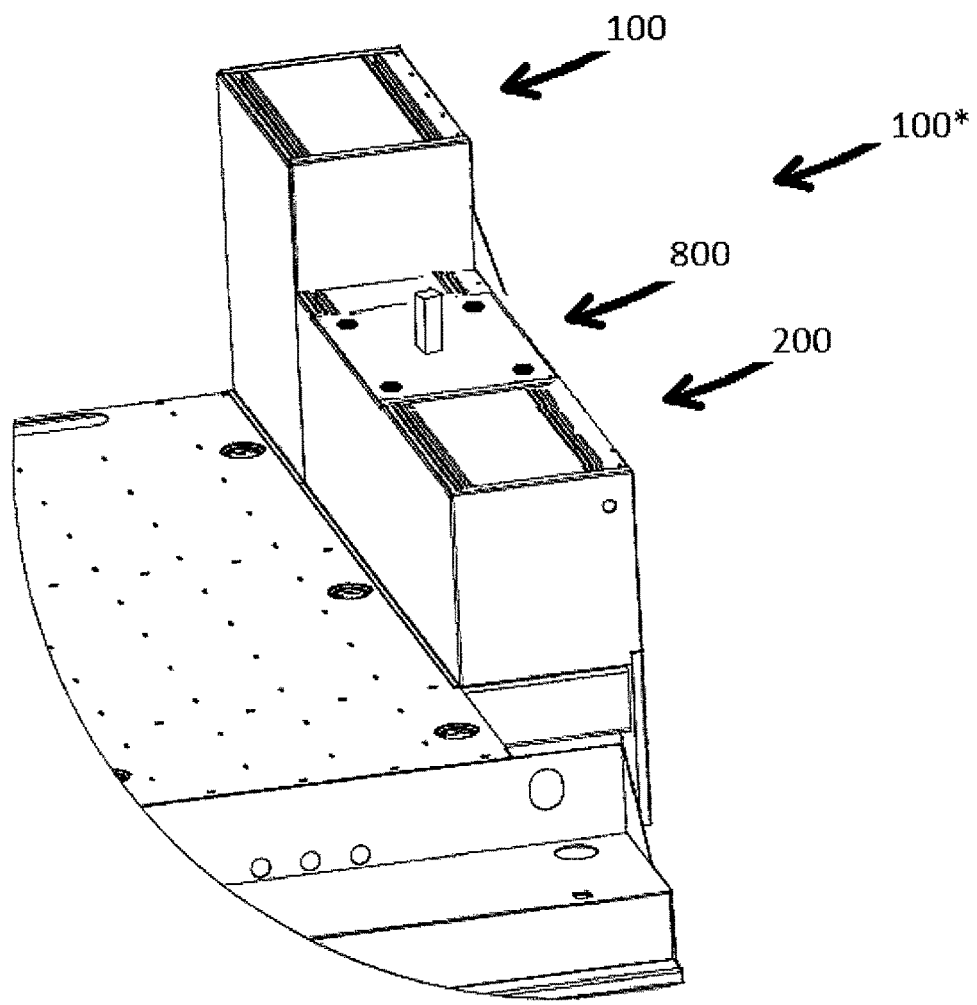

In example embodiments, if it is desired to move the option 800 along the length of the second substructure 200, the securing members 700 may be loosened by rotating the cylindrical members 712. In the loosened position the option 800 may be slid along the third and fourth tracks 530 and 540 until it is arranged at a desired location (for example, as shown in FIG. 11E). The option 800 may then be secured to the new location by tightening the securing members 800 as explained above. This provides a significant advantage over the prior art which generally requires the formation of new holes in a top panel of a substructure every time it is moved from one location to another.

Figure 12A:
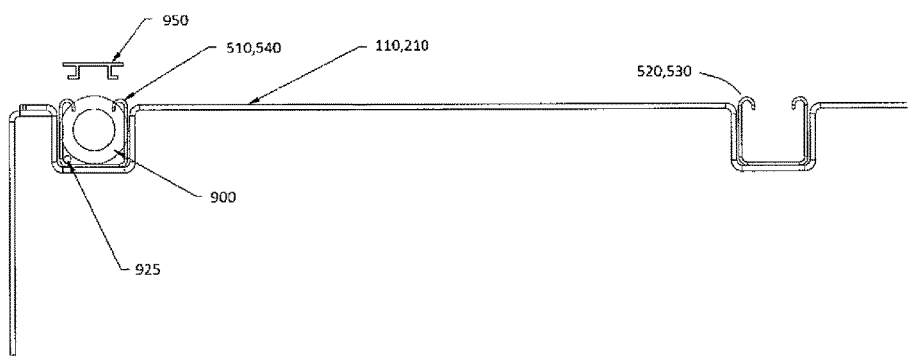
FIGS. 12A-12B illustrate additional features of a side pack in accordance with example embodiments.
Figure 12B:
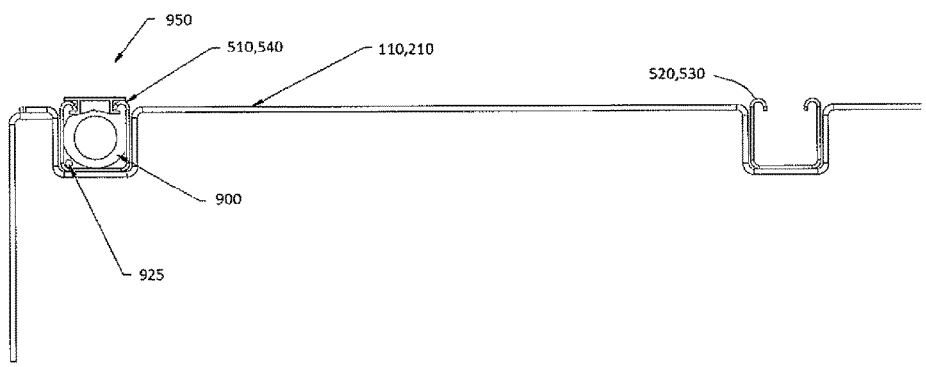

Example embodiments provide additional advantages over the prior art. For example, as shown in FIG. 12A, a cable 925 (which may be an electrical cable or another member such as, but not limited to, a pneumatic hose, or a hydraulic hose, or any member that may be used to transmit power) may be routed through any one of (or all of) the tracks that may be installed therein. Thus, in example embodiments, cables 925 may be arranged in a location where there is little chance they may be damaged. In addition, example embodiments also include elements to prevent fluid from entering the tracks. For example, as shown in FIGS. 12A-12B, example embodiments include a cover 950 which may be configured to snap on to the tracks as shown in FIG. 12B. The cover 950 may prevent elements, for example water, from entering the tracks. The tracks may also be further filled with sealing member 900, for example, a closed cell foam member, which may be inserted into the tracks such that when the cover 950 is snapped into place, the member 900 may be deformed so as to press against the sidewalls of the tracks to prevent moisture from entering therein.

In example embodiments, the side pack 100* may further include a drain system. In example embodiments, the channels associated with the first and second top panels 110 and 120 may inadvertently may be exposed to a liquid, for example, water. Thus, in example embodiments, ends of the channels may include apertures to allow the liquid to flow out of the channels and into a drain system. For example, a floor F1 of the first channel 120 may include a first aperture A1 and a floor F2 of the second channel may include a second aperture A2 (see FIG. 5A). In example embodiments, the floors F1 and F2 may connect sidewalls of their respective channels to one another.

Figure 13:
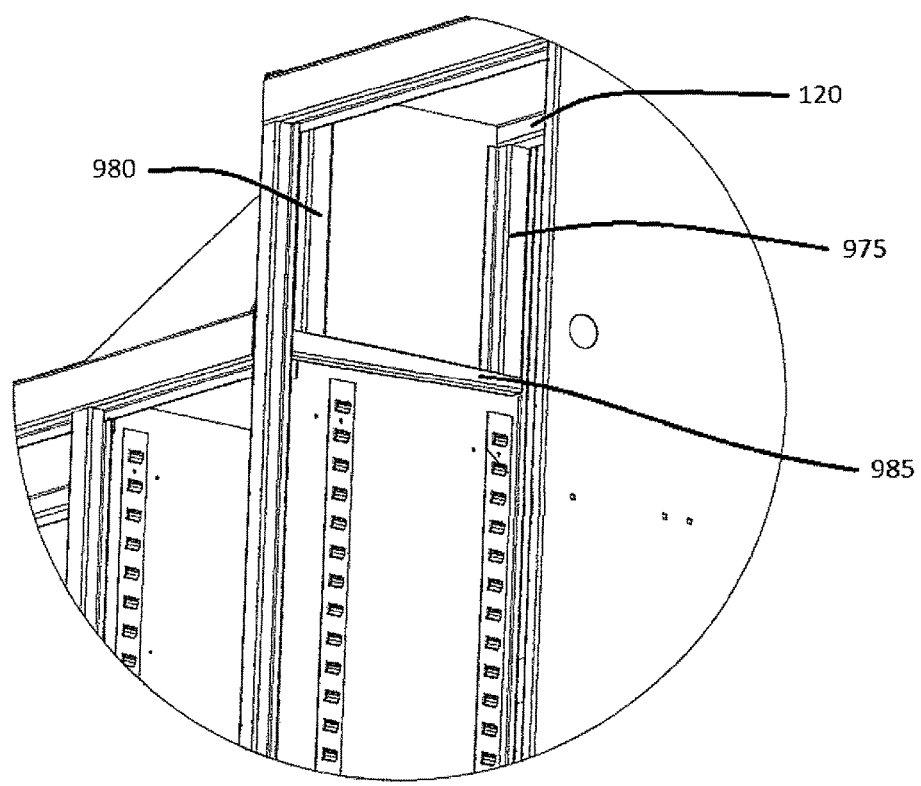
FIG. 13 is a view of a drainage system in accordance with example embodiments.

FIG. 13 illustrates an example of the drain system usable with example embodiments. In example embodiments, the drain system may include a first pipe 975 configured to receive a fluid from the first channel 120 (through the aforementioned aperture A1 of the first channel 120) and a second pipe 980 configured to receive a fluid from the second channel 130 (through the aperture A2 of the second channel 130). The first and second pipes 975 and 980 may be connected to a third pipe 985 which may be configured to receive fluid from the first pipe 975 and the second pipe 980. The third pipe 985 may drain any fluid connected therein by passing the fluid through an aperture of the side pack 100*.

In example embodiments, the third and fourth channels in the second top panel 210 may likewise have floors with apertures. In example embodiments, pipes (not shown) may connect the third and fourth channels to the first and second channels 120 and 130 to facilitate fluid flow between the channels. For example, in one particular nonlimiting embodiment, a pipe may connect the first channel 120 to the fourth channel (which may house the fourth track 540) and a second pipe may connect the second channel 130 to the third channel (which may house the third track 530).

In example embodiments, the top panels 110 and 120 may be formed form a plate material and then attached to secondary members such as side wall members. For example, as shown in at least FIG. 4, the first top panel 110 may be connected to a first side wall 105 and the second top panel 210 is connected to a second side wall 205. This is not intended to be a limiting feature of example embodiments. For example, the first top panel 110 and the first side wall 105 may be formed as a single integral piece through a casting process. Similarly, the second side wall 205 and the second top panel 210 may be formed as a single integral piece from a casting process.

Figure 14:
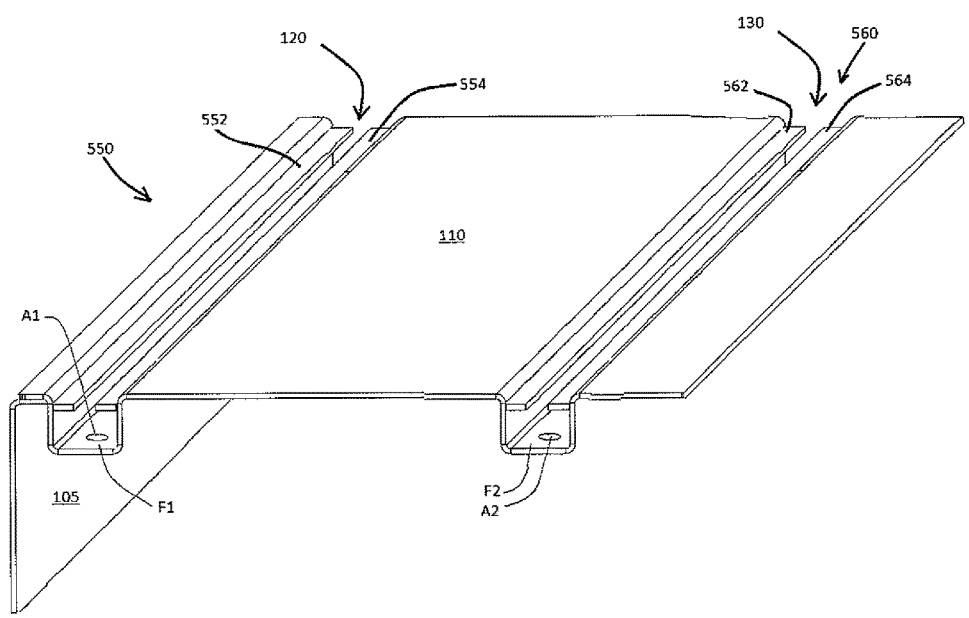
FIG. 14 is a view of a first top panel with a pair of tracks installed therein.
Figure 15A:
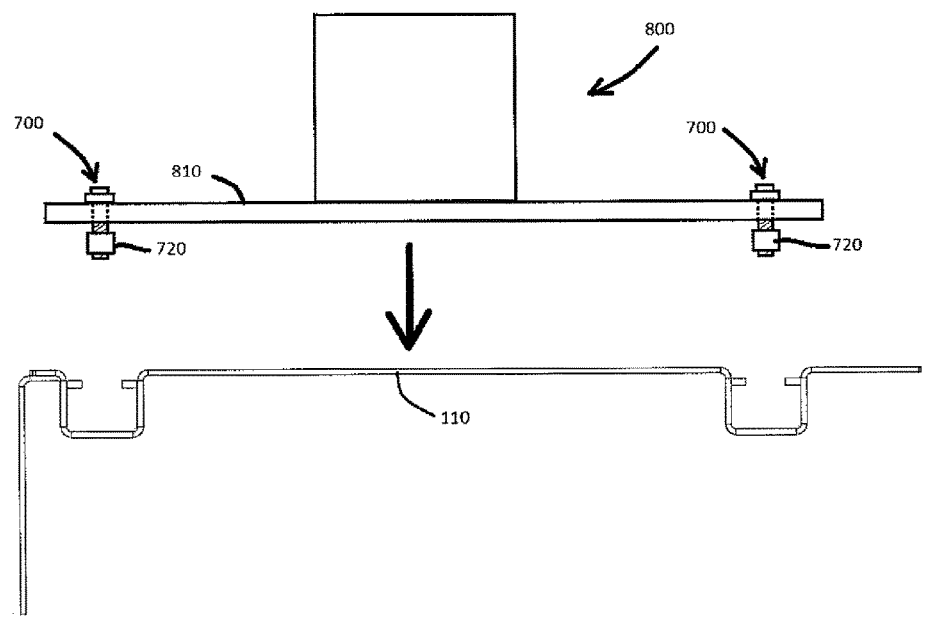
FIGS. 15A-15C are views illustrating various operations associated with attaching an option to a top panel.
Figure 15B:
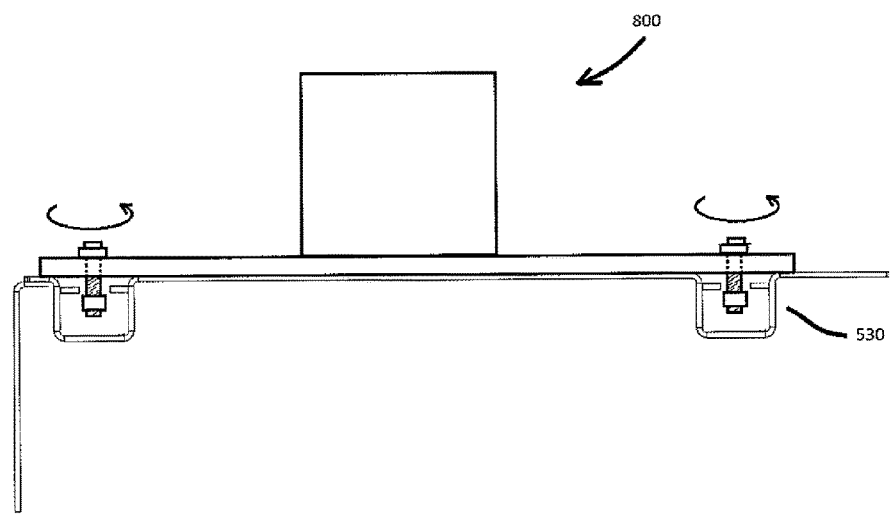
Figure 15C:
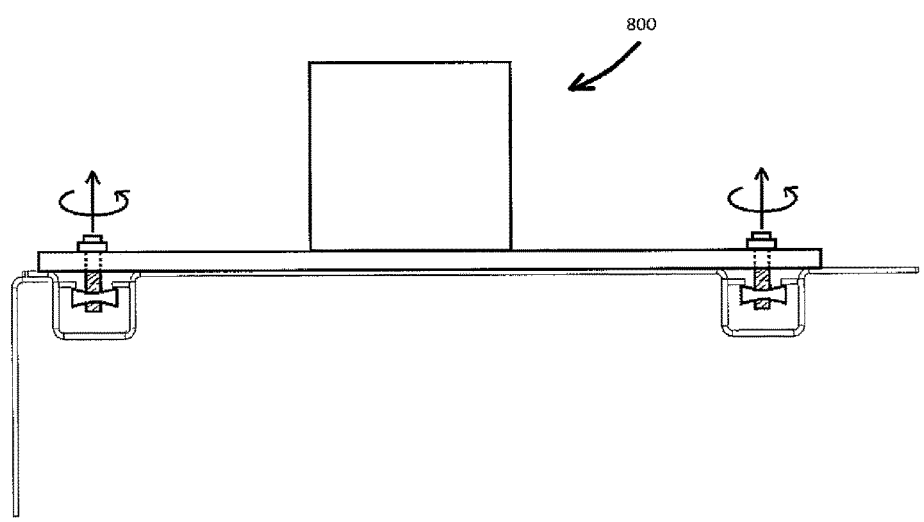

The aforementioned examples are illustrative only and are not intended to limit the invention as the inventive concepts may be applied in other ways. For example, FIG. 14 illustrates another example of the invention. In this particular nonlimiting example, the first top panel 110 includes a pair of elongated protrusions 552 and 554 forming another example of a track 550. Similarly, the first panel 110 may also include a second pair of elongated protrusions 562 and 564 forming another example of a track 560. In example embodiments, the tracks 550 and 560 may be usable for securing an option to the first top panel 110 as shown in FIGS. 15A-15C. Because the operations of FIGS. 15A-15C are substantially similar to the operations illustrated in 11A-11D, a detailed description thereof is omitted for the sake of brevity.

In example embodiments, the channeled panels offer not only an ability to adjustably connect members to a side pack, but also strengthen and reinforce the side pack. For example, in the conventional art, top panels have a relatively low section modulus since they are typically comprised of a flat plate. As a consequence, conventional top plates usually have low resistance to bending loads. Thus, in the conventional art, when structures are attached to conventional top panels, the top panels are reinforced by structural members (for example, structural tubes) to reinforce the top panels. In example embodiments, however, the section modulus of the top panels 110 and 210 are relatively high due to the presence of the channels (for example, 120 and 130). Accordingly, top panels 110 and 210 of the side pack 100* in accordance with example embodiments may require no reinforcing members. As a consequence, because reinforcing members may not be required in the construction of the side pack 100*, a complexity and cost of manufacturing a side pack 100* may be reduced.

In example embodiments, the side pack 100* offers additional advantages compared to the conventional art. For example, in the conventional art, as well as in accordance with example embodiments, the side packs may be constructed first, and then moved near a bed of a truck for attachment thereto. In the conventional art, moving devices, for example, a fork lift and/or a crane, may be used to move the finished side pack to the bed of a truck. In the conventional art, for example, a jig may be attached to the conventional side pack so that a chain of a crane may be attached thereto to move the conventional side pack to the bed of the truck. However, in the conventional art, if the jig is not located above a center of gravity of the conventional side pack, the conventional side pack may rotate making it difficult to place the conventional side pack on a truck for attachment thereto. In example embodiments, however, a jig may be adapted to connect to the side pack as described above (for example, by connecting to the tracks of the top panels). Accordingly, if the jig is placed at a location other than above the center of gravity (CG) of the side pack causing the side pack to rotate, the side pack may be positioned back on the ground so that the jig may be moved above the center of gravity and reattached as described above. In this way, the side pack 100* may be moved to a truck bed in a position which highly desirable for attaching the side pack 100* to the bed of the truck.

Figure 16A:
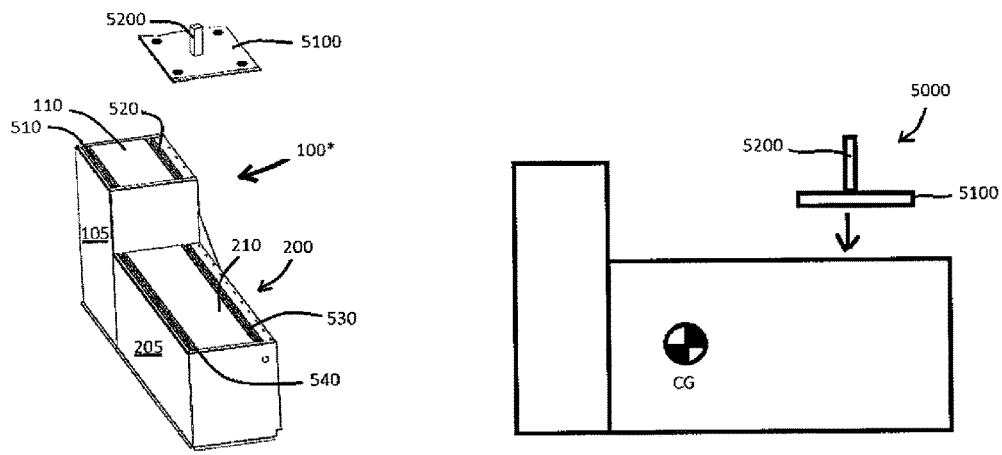
FIGS. 16A-16C are views illustrating a method of moving a side pack in accordance with example embodiments.
Figure 16B:
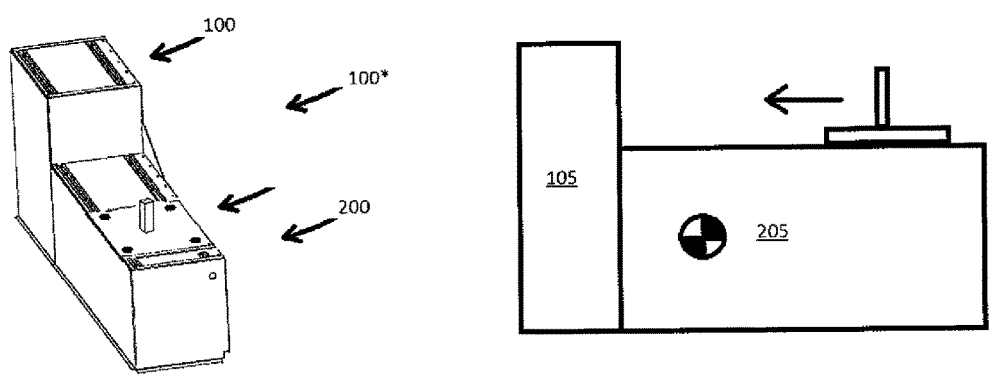
Figure 16C:
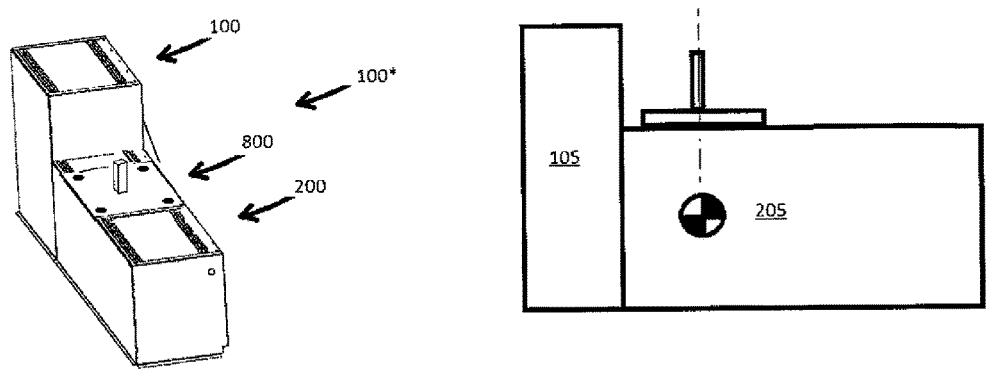

FIGS. 16A-16C illustrate an example of a method of moving a side pack 100* in accordance with example embodiments. In example embodiments, the method may include providing a jig 5000 above the tracks of the side pack 100*. In FIG. 16A, the left figure represents an isometric view of the jig 5000 and the side pack 100* and the right figure represents a side view of the side pack 100* and the jig 5000. In the right side figure, the center of gravity CG of the side pack 100* is marked for purposes of clarity. In example embodiments, the jig 5000 may include a plate 5100 having holes at the corner thereof and a post 5200 extending from the plate. Though not shown in the figures, the post 5200 may include a connecting structure, for example, a hook or an eye, that allows the post 5200 to connect to a moving device, for example, a crane. The plate 5100 may be attached to the tracks of the side pack 100* as described above (for example, with fasteners). In example embodiments, the jig 5000 may be slid along the tracks (as shown in FIG. 16B) until it is over the center of gravity CG of the side pack 100* as shown in FIG. 16C. At this location, the fasteners may be tightened to secure the jig 5000 in place. In this location, a vertical force may be applied to the post 5200 to lift the side pack 100* vertically with little to no rotation.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A side pack for a vehicle comprising:
   a first top panel, the first top panel of the side pack having at least one elongated channel, the at least one elongated channel having at least two parallel elongated side walls and at least one elongated floor forming a substantially C-shaped cross section, the first top panel of the side pack further including at least a pair of protrusions protruding into a space between the at least two parallel elongated side walls, the pair of protrusions configured to interface with a securing member.

2. The side pack according to claim 1, wherein the at least one elongated floor includes a first aperture arranged near an end of the at least one elongated channel.

3. The side pack of claim 1, wherein
   the at least one elongated channel is a pair of parallel elongated channels in the first top panel of the side pack, the at least two parallel walls includes a first elongated wall, a second elongated wall, a third elongated wall, and a fourth elongated wall, the at least one elongated floor includes a first elongated floor and a second elongated floor, and the at least one pair of protrusions includes a first protrusion, a second protrusion, a third protrusion, and a fourth protrusion, the first elongated channel comprising the first and second elongated walls, the first elongated floor, and the first protrusion and the second protrusion extending into an area between the first and second elongated walls, the second elongated channel comprising the third and fourth elongated walls, the second elongated floor, and the third and fourth protrusions extending into an area between the third and fourth elongated walls, the first, second, third, and fourth elongated walls being parallel with one another.

4. The side pack of claim 3, further comprising:
   a drainage system that includes a tubular pipe configured to receive water from at least one of the first and second elongated channels.

5. The side pack of claim 4, wherein the drainage system further includes a third pipe configured to receive water from the tubular pipe.

6. The side pack of claim 4, further comprising:
a second top panel with a third elongated channel, wherein at least one of the tubular pipe is configured to deliver water to the third elongated channel.

7. The side pack of claim 1, further comprising:
a member routed through the first elongated channel, the member being configured to transmit power.

8. The side pack of claim 7, wherein the member is one of an electrical cable, a hydraulic hose, and a pneumatic hose.

9. The side pack of claim 1, further comprising:
a sealant in the at least one channel.

10. The side pack of claim 9, wherein the sealant is comprised of foam.

11. The side pack of claim 9, further comprising:
a cover adjacent to the sealant.

12. The side pack of claim 1, wherein the at least two parallel elongated side walls, the at least one elongated floor, and the pair of protrusions of the top panel are an integral structure.

\* \* \* \* \*